United States Patent
Moriya

(10) Patent No.: US 8,051,836 B2
(45) Date of Patent: Nov. 8, 2011

(54) CONTROL APPARATUS OF INTERNAL COMBUSTION ENGINE

(75) Inventor: Hidenori Moriya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 309 days.

(21) Appl. No.: 12/529,607

(22) PCT Filed: Feb. 28, 2008

(86) PCT No.: PCT/JP2008/054001
§ 371 (c)(1),
(2), (4) Date: Sep. 2, 2008

(87) PCT Pub. No.: WO2008/108419
PCT Pub. Date: Sep. 12, 2008

(65) Prior Publication Data
US 2010/0089363 A1 Apr. 15, 2010

(30) Foreign Application Priority Data
Mar. 2, 2007 (JP) .................. 2007-053260

(51) Int. Cl.
*F02D 41/00* (2006.01)
*G01M 15/00* (2006.01)

(52) U.S. Cl. .................. 123/435; 123/575; 73/114.38

(58) Field of Classification Search ............. 123/435, 123/436, 406.22, 406.41–406.43, 1 A, 27 R, 123/575; 701/103, 108, 111, 115; 702/182; 73/114.16, 114.17, 114.38, 114.52, 114.53
See application file for complete search history.

(56) References Cited

U.S. PATENT DOCUMENTS

| 4,905,649 A | 3/1990 | Washino et al. | |
| 7,599,781 B2 * | 10/2009 | Yamaguchi et al. | 701/103 |
| 2007/0169748 A1 | 7/2007 | Nakayama et al. | |
| 2008/0262699 A1 * | 10/2008 | Hasegawa et al. | 701/103 |

FOREIGN PATENT DOCUMENTS

| JP | 64 88153 | 4/1989 |
| JP | 7 42607 | 2/1995 |
| JP | 10 19775 | 1/1998 |
| JP | 2005 273513 | 10/2005 |
| JP | 2005 344550 | 12/2005 |
| JP | 2005 344557 | 12/2005 |

* cited by examiner

Primary Examiner — Willis Wolfe, Jr.
Assistant Examiner — Johnny Hoang
(74) Attorney, Agent, or Firm — Oblon, Spivak, McClelland, Maier & Neustadt, L.L.P.

(57) ABSTRACT

An internal combustion engine (1) is provided with an in-cylinder pressure sensor (15) for detecting an in-cylinder pressure in a combustion chamber (3) and an ECU (20). The ECU 20 calculates a heat release quantity parameter showing a combustion state based upon a detected in-cylinder pressure, calculates a combustion delay based upon the detected in-cylinder pressure, and determines fuel property based upon a comparison between a calculated heat release quantity parameter and the calculated combustion delay; and a heat release quantity parameter and a combustion delay corresponding to reference fuel.

7 Claims, 5 Drawing Sheets

CONTROL APPARATUS OF INTERNAL COMBUSTION ENGINE

TECHNICAL FIELD

The present invention relates to a control apparatus of internal combustion engine, and particularly, to a control apparatus of an internal combustion engine with a function of determining fuel property.

BACKGROUND ART

Conventionally, as a technology for directly detecting property of fuel, there is proposed a detecting apparatus which detects viscosity and specific gravity of inspection object fuel from a refractive index thereof (Japanese Patent Laid-Open No. H10-19775 (1998)). However, this detecting apparatus has the structure which is complicated and expensive, and therefore, is far from being practical.

On the other hand, there are provided an apparatus which calculates a heat release quantity parameter correlating with a combustion rate based upon a pressure and a volume of a combustion chamber to measure a cetane number of fuel based upon a change of the heat release quantity parameter in a given operating condition (Japanese Patent Laid-Open No. 2005-344550), an apparatus which measures a cetane number of fuel based upon a period until the fuel is ignited (Japanese Patent Laid-Open No. 2005-344557, and an apparatus which measures a lower heating quantity of fuel to determine property of the fuel (Japanese Patent Laid-Open No. S64-88153 (1989)).

However, the measurement accuracy of each of these conventional technologies is not necessarily satisfactory. In addition, in recent years, fuel for an internal combustion engine has been diversified as, for example, bio fuel or GTL (gas liquid fuel), and therefore, it is desired to accurately determine fuel components even in such various kinds of the fuel.

Therefore, an object of the present invention is to provide means for accurately determining fuel property.

DISCLOSURE OF THE INVENTION

A control apparatus of an internal combustion engine according to the present invention comprises in-cylinder pressure detecting means for detecting an in-cylinder pressure in a combustion chamber of an internal combustion engine, heat release quantity parameter calculating means for calculating a heat release quantity parameter showing a combustion state based upon the detected in-cylinder pressure, combustion delay calculating means for calculating a combustion delay based upon the detected in-cylinder pressure, and fuel property determining means for determining fuel property based upon a comparison between the calculated heat release quantity parameter and the calculated combustion delay, and a heat release quantity parameter and a combustion delay corresponding to reference fuel.

It is preferable that the heat release quantity parameter calculating means calculates a product value of the detected in-cylinder pressure and a value found by exponentiating a combustion chamber volume at a point of detecting the in-cylinder pressure with a value close to a ratio of specific heat of a mixture supplied, as the heat release quantity parameter.

It is preferable that the fuel property determining means compares a mean value of the detected heat release quantity parameters for the respective cycles with a mean value of the heat release quantity parameters for the respective cycles corresponding to the reference fuel. In addition, an integrated value of the heat release quantity parameters for the respective cycles may be compared with an integrated value of the heat release quantity parameters for respective cycles corresponding to the reference fuel.

It is preferable that the heat release quantity parameter calculating means calculates a value found by dividing an indicated heat quantity by a lower heating quantity, as the heat release quantity parameter.

It is preferable that the combustion delay calculating means calculates the combustion delay based upon a changing quantity of a combustion rate.

It is preferable to be further provided with changing means for changing a plurality of control value maps based upon the determination result of the fuel property determining means.

BEST MODE OF CARRYING OUT THE INVENTION

Figure 5:
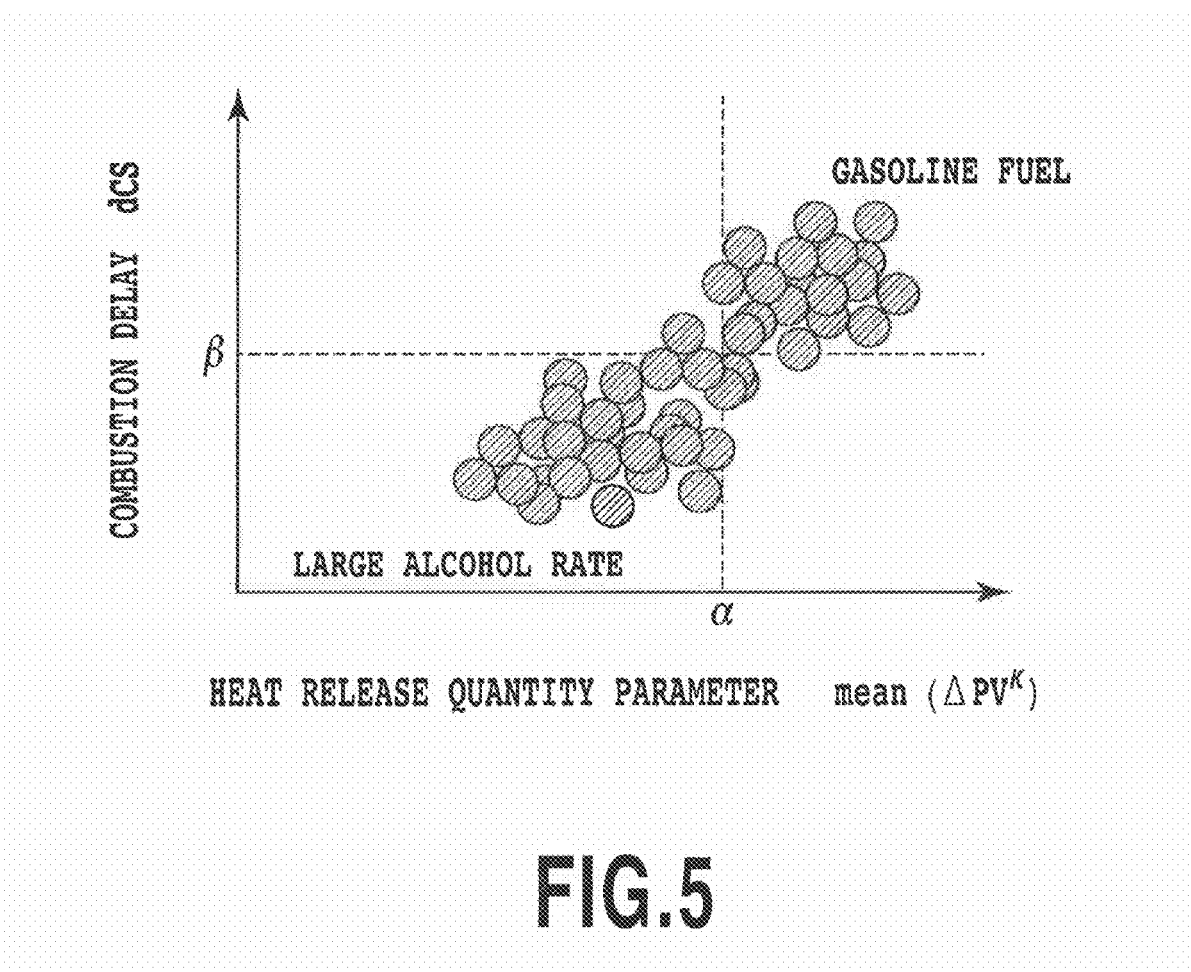
FIG. 5 is a graph exemplifying a relation between an alcohol content in fuel, and a heat release quantity parameter and a combustion delay.

For example, in a case of using gasoline and alcohol mixing fuel, as shown in FIG. 5, there is a tendency that the higher an alcohol content to the fuel is, the smaller a heat release quantity and a combustion delay would be. Therefore, according to the present invention, fuel property is determined based upon both of heat release quantity parameter and combustion delay, making it possible to accurately determine fuel property.

It is preferable that the heat release quantity parameter calculating means calculates a product value $PV^\kappa$ of the detected in-cylinder pressure P and a value found by exponentiating a combustion chamber volume V at a point of detecting the in-cylinder pressure P with a value close to a ratio of specific heat $\kappa$ of a mixture supplied, as the heat release quantity parameter.

It is found out that $PV^\kappa$=constant in an adiabatic change from a state equation of gas: PV=nRT (P: pressure, V: volume, n: mol number of gas, R: gas constant (J/mol·K), and T: temperature (K)). Therefore, a changing quantity of $PV^\kappa$ at the time the fuel burns in the combustion chamber (that is, a difference between two points) depends on energy generated by the combustion. Accordingly, $PV^\kappa$ has a high correlation with the heat release quantity in the combustion chamber and by determining the fuel property using $PV^\kappa$ as the heat release quantity parameter, the property of the fuel can be determined with higher accuracy. The in-cylinder pressure P can be directly detected by an in-cylinder pressure sensor, and the volume (in-cylinder volume) V can be directly found from a crank angle by a given map or a given function. Constant $\kappa$ is required only to be a value close to a ratio of specific heat of air-fuel mixture formed in the combustion chamber and may be a fixed value determined in advance, or may change in accordance with an intake air quantity or a fuel injection quantity or the like.

Hereafter, by referring to the accompanying drawings, the best modes for carrying out the present invention will be specifically described.

Figure 1:
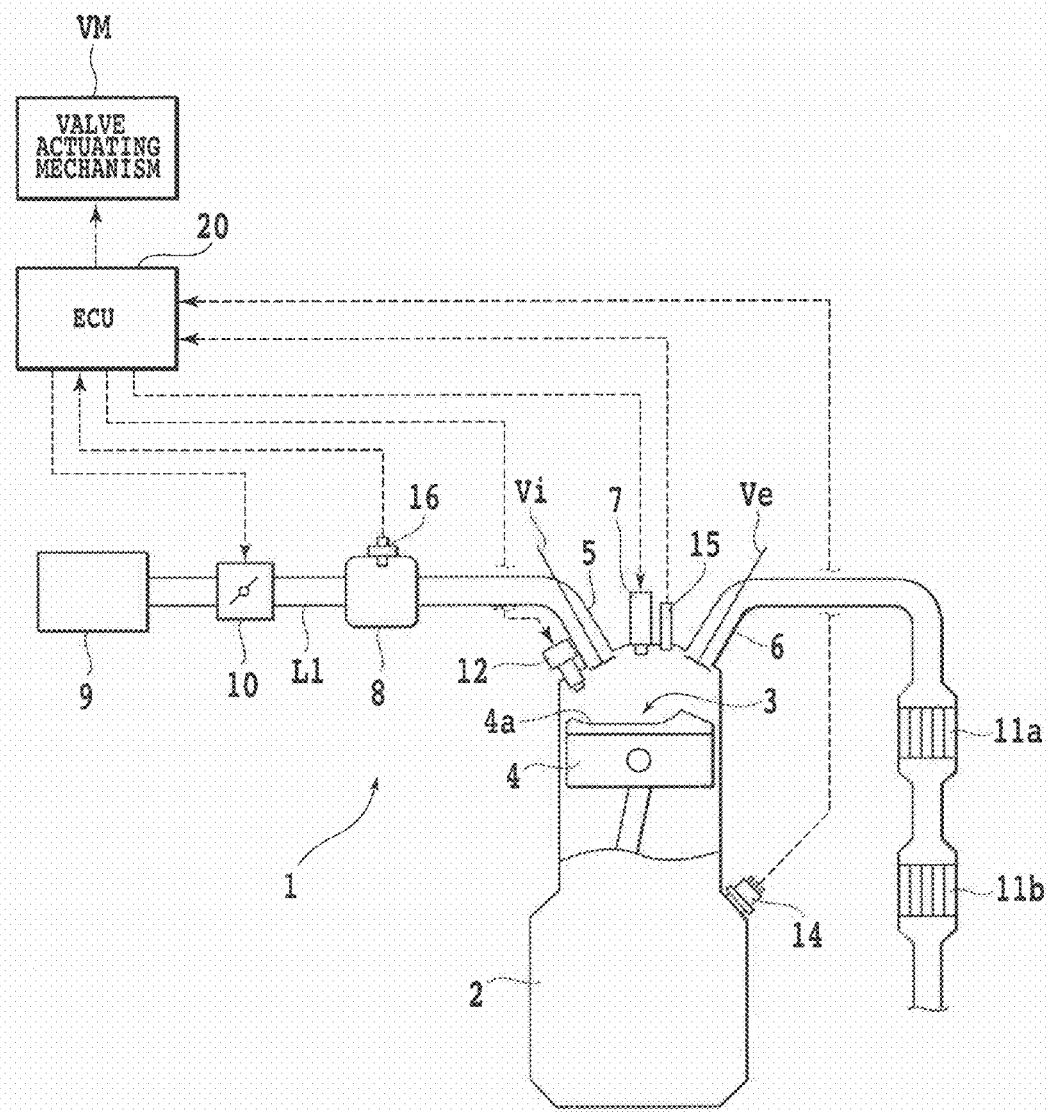
FIG. 1 is a schematic construction diagram showing an internal combustion engine to which a control apparatus according to the present invention is applied.

FIG. 1 is a schematic construction view showing an internal combustion engine to which a control apparatus of the present invention is applied. An internal combustion engine 1 shown in the figure generates engine power by burning a mixture of fuel and air inside a combustion chamber 3 formed in a cylinder block to reciprocate a piston 4 in the combustion chamber 3. The internal combustion engine 1 can be operated either by gasoline or by mixture fuel of gasoline and alcohol. The internal combustion engine 1 is preferably configured as a multi-cylinder engine and for example, the internal combustion engine 1 according to the embodiment is configured as a four-cylinder engine.

An intake port in each of the combustion chambers 3 is connected to an intake pipe (intake manifold) 5 and an exhaust port in each of the combustion chambers 3 is connected to an exhaust pipe (exhaust manifold) 6. A cylinder head of the internal combustion engine 1 is provided with an intake valve Vi and an exhaust valve Ve disposed for each of the combustion chambers 3. Each of the individual intake valves Vi opens and closes its associated intake port and each of the individual exhaust valves Ve opens and closes its associated exhaust port.

The intake valve Vi and the exhaust valve Ve respectively are opened and closed by a valve actuating mechanism VM including a variable valve-timing mechanism. The internal combustion engine 1 is further provided with ignition plugs 7 the number of which corresponds to the number of cylinders, and the ignition plug 7 is disposed at the cylinder head so as to be exposed to the associated combustion chamber 3.

The intake pipe 5 is connected to a surge tank 8 as shown in FIG. 1. An air supply line L1 is connected to the surge tank 8. The air supply line L1 is connected to an air inlet (not shown) through an air cleaner 9. A throttle valve (in the present embodiment, an electronically controlled throttle valve) 10 is incorporated in the halfway of the air supply line L1 (between the surge tank 8 and the air cleaner 9). On the other hand, as shown in FIG. 1, for example, a pre-catalysis apparatus 11a including a three-way catalyst and for example, a post-catalyst apparatus 11b including a NOx absorption reduction catalyst are connected to the exhaust pipe 6.

Furthermore, the internal combustion engine 1 is provided with a plurality of injectors 12 each of which, as shown in FIG. 1, is disposed at the cylinder head so as to be exposed to an inside of the associated combustion chamber 3. Each of the pistons 4 of the internal combustion engine 1 is constructed in a so-called deep-dish top shape and an upper face thereof is provided with a recess 4a. In the internal combustion engine 1, with intake air aspired into each of the combustion chambers 3, each of the injectors 12 injects fuel such as gasoline directly toward the recess 4a of the piston 4 in each of the combustion chambers 3. Accordingly, in the internal combustion engine 1, a layer of the mixture of fuel and air is formed (stratified) in the vicinity of the ignition plug 7 in a state of being separated from its surrounding air layer, enabling stable stratified combustion to be performed using an extremely lean mixture. The internal combustion engine 1 in the present embodiment is explained as a so-called in-cylinder injection engine, but the present invention is not limited to this type engine and may be applied to an intake pipe (intake port) injection type internal combustion engine without mentioning.

Each of the ignition plugs 7, the throttle valves 10, each of the injectors 12, the valve actuating mechanism VM, and the like as described above are electrically connected to the ECU 20, which serves as a control apparatus of the internal combustion engine 1. The ECU 20 includes a CPU, a ROM, a RAM, I/O ports, a memory device, and the like any one of which is not shown in the figure. To the ECU 20, as shown in the FIG. 1, various sensors including a crank angle sensor 14 are electrically connected. The ECU 20 controls the ignition plug 7, the throttle valve 10, the injector 12, the valve actuating mechanism VM, and the like by using various maps stored in the memory device and the like, as well as based on a value detected by each of the sensors and the like so as to produce a desired output.

The internal combustion engine 1 is provided with in-cylinder pressure sensors 15 (in-cylinder pressure detecting means) each including a semiconductor, a piezoelectric element, a magneto strain element, an optical fiber detecting element or the like. The number of the in-cylinder pressure sensors 15 corresponds to the number of the cylinders. Each of the in-cylinder pressure sensors 15 is disposed at the cylinder head with its pressure-receiving face being exposed to the inside of the associated combustion chamber 3 and is electrically connected to the ECU 20 through an A/D converter or the like not shown in the figure. Each of the in-cylinder pressure sensors 15 outputs the pressure (in-cylinder pressure) applied on its pressure-receiving face in the combustion chamber 3 as a value relative to an atmospheric pressure and supplies an electrical signal (a signal indicating the detected value) corresponding to the pressure applied to its pressure-receiving face to the ECU 20.

Furthermore, the internal combustion engine 1 is provided with an intake pressure sensor 16 for detecting a pressure (intake pressure) of the intake air in the surge tank 8 as an absolute pressure. The intake pressure sensor 16 is also electrically connected to the ECU 20 through an A/D converter (not shown) or the like to supply a signal indicating the detected absolute pressure of the intake air in the surge tank 8 to the ECU 20. It should be noted that the values detected by the crank angle sensor 14 and the intake pressure sensor 16 are sequentially supplied to the ECU 20 at every minute time, and are stored and retained in a given storage region (buffer) of the ECU 20 by a given quantity.

In addition, the value detected by each of the in-cylinder pressure sensors 15 (in-cylinder pressure) is corrected in absolute pressure based upon the detection value of the intake pressure sensor 16, and thereafter, is stored and retained in a given storage region (buffer) of the ECU 20 by a given quantity.

Two kinds of fuel injection quantity maps, two kinds of injection timing maps, and two kinds of ignition timing maps which are in advance produced are stored in the ROM in the ECU 20. One of the two kinds of the maps respectively corresponds to gasoline fuel, and the other corresponds to gasoline and alcohol mixing fuel. It should be noted that the respective maps are configured so that, for example, an intake air quantity and an engine rotation speed are used as input variables, and a fuel injection quantity, an injection timing and an ignition timing can be read out in response to these values. The ROM in the ECU 20 further stores functions and programs for correcting the fuel injection quantity, the injection timing, and the ignition timing read out from the respective maps based upon various other parameters such as an intake temperature, a throttle opening, and an engine water temperature showing an operating condition.

Figure 2:
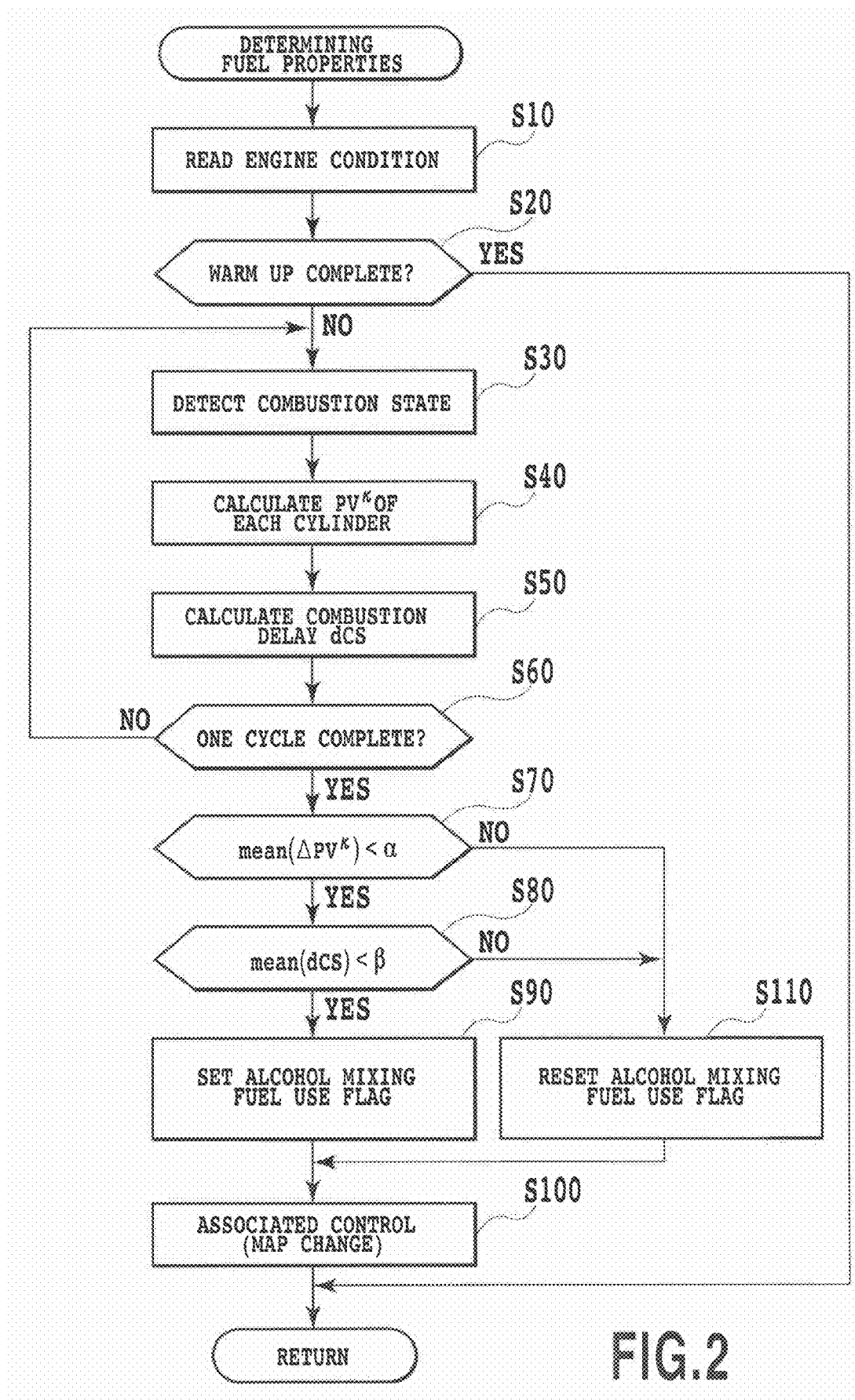
FIG. 2 is a flowchart illustrating a routine for determining fuel property in the internal combustion engine shown in FIG. 1.

Next, by referring to FIG. 2, the process order for determining the fuel property in the aforementioned internal combustion engine 1 will be explained. When an ignition key (not shown) is operated for starting the internal combustion engine 1, the fuel property determining routine shown in FIG. 2 is performed by the ECU 20. The processes by this routine are performed in the first cycle after engine starting, but may be performed at any point within a predetermined period from the engine starting point. In FIG. 2, the ECU 20, first, reads parameters reflecting engine condition (S10). The parameter read herein is one or plural kinds of parameters showing whether or not an engine is already warmed up, for example, an engine water temperature. Next, the ECU 20 compares the read parameter with a predetermined reference value to determine whether or not the engine is already warmed up (S20). If the engine is already warmed up, the process returns.

If the engine is not yet warmed up, the ECU 20 detects a combustion state in each combustion chamber (S30). In the present embodiment, detection values of the in-cylinder pressure sensor 15 in predetermined plural crank angles are obtained for each cylinder, which will be stored in a given storage region of the ECU 20.

Next, the ECU 20 calculates a value of $PV^\kappa$ for each cylinder based on the in-cylinder pressure P, the in-cylinder volume V and a predetermined ratio of specific heat determined in advance as described above or a value close to that in a given reference crank angle, as the heat release quantity parameter (S40), which will be stored in a given storage region in the ECU 20.

Figure 3:
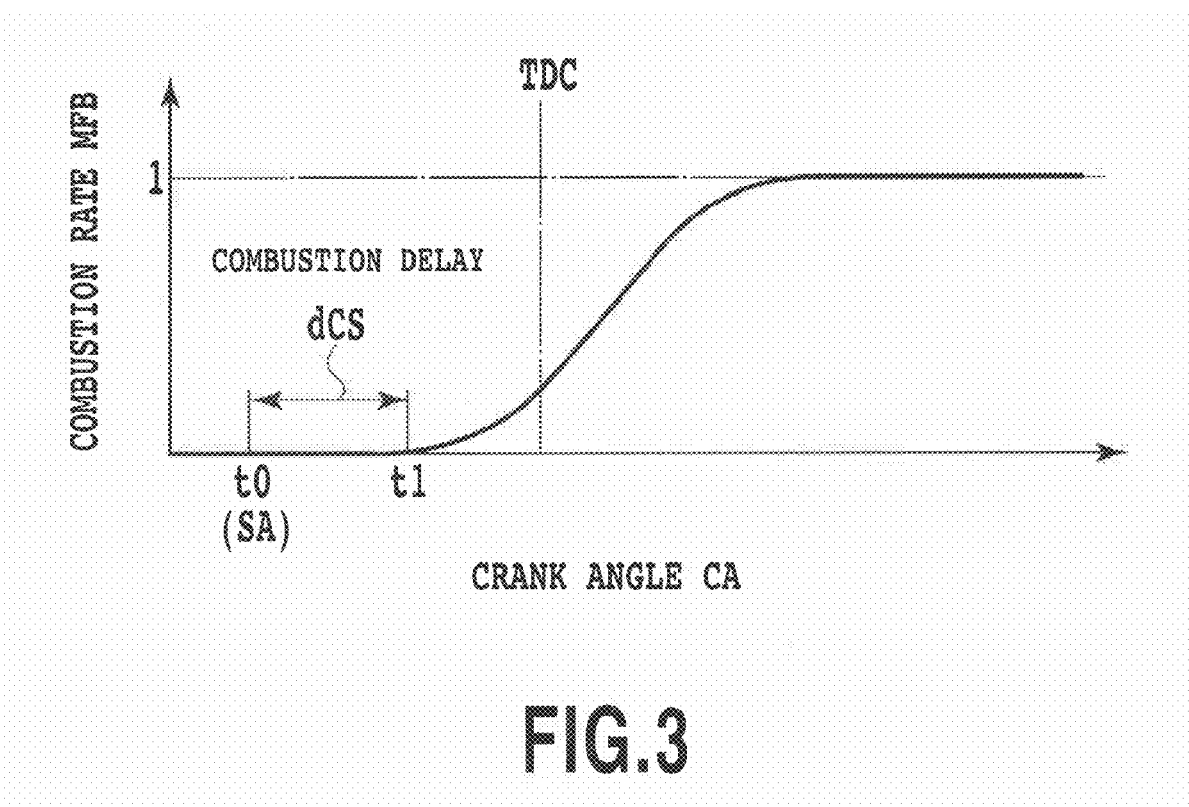
FIG. 3 is a graph exemplifying a relation between a combustion rate and a combustion delay.

The ECU 20 calculates a value of a combustion delay dCS for each cylinder by a given function (S50), which will be stored in a given storage region in the ECU 20. The combustion delay dCS can be calculated from the in-cylinder pressure P and the in-cylinder volume V at the plural crank angle obtained at step S30. Specifically, the ECU 20 calculates the heat release quantity parameter $PV^\kappa$ at the plural crank angles and from these values, finds a combustion rate MFB as a ratio of the heat release quantity until a given timing between two points (for example, −180° ATDC which is thought to be sufficiently earlier than a combustion start point and 135° ATDC which is thought to be sufficiently later than a combustion completion point) to a total hear release quantity between the two points. As shown in FIG. 3, a rising point t1 of the combustion rate MFB is found by a given function. Such a given function determines that, for example, a point is a rising point t1 when ΔMFB as a changing quantity of the combustion rate for a minute time Δt exceeds a given reference value. The ECU 20 calculates and stores a time difference between an ignition timing t0 and the rising point t1 as a combustion delay dCS for each cylinder. The processes of steps S30 to S50 are repeatedly performed until one cycle is completed in all cylinders (S60).

When the detections and the calculations for all the cylinders are completed, the ECU 20 compares a mean value of the heat release quantities for the respective cycles with a value in the reference fuel (S70). Specifically, the ECU 20 divides an increasing quantity $\Delta PV^\kappa$ of $PV^\kappa$ as the heat release quantity parameter calculated at step S40 from a bottom dead center during an intake stroke by a lower heating quantity $Q_{fuel}$ per a given unit of the reference fuel and a fuel injection quantity Tau for normalization according to the next equation (1). The obtained value is integrated for each cycle, which is divided by the number n of cylinders to calculate a mean value mean ($\Delta PV^\kappa$).

$$\mathrm{mean}(\Delta PV^K) = \frac{1}{n}\sum_{i=1}^{n} dPV_i^K / (Q_{fuel} \cdot Tau) \quad (1)$$

Figure 4:
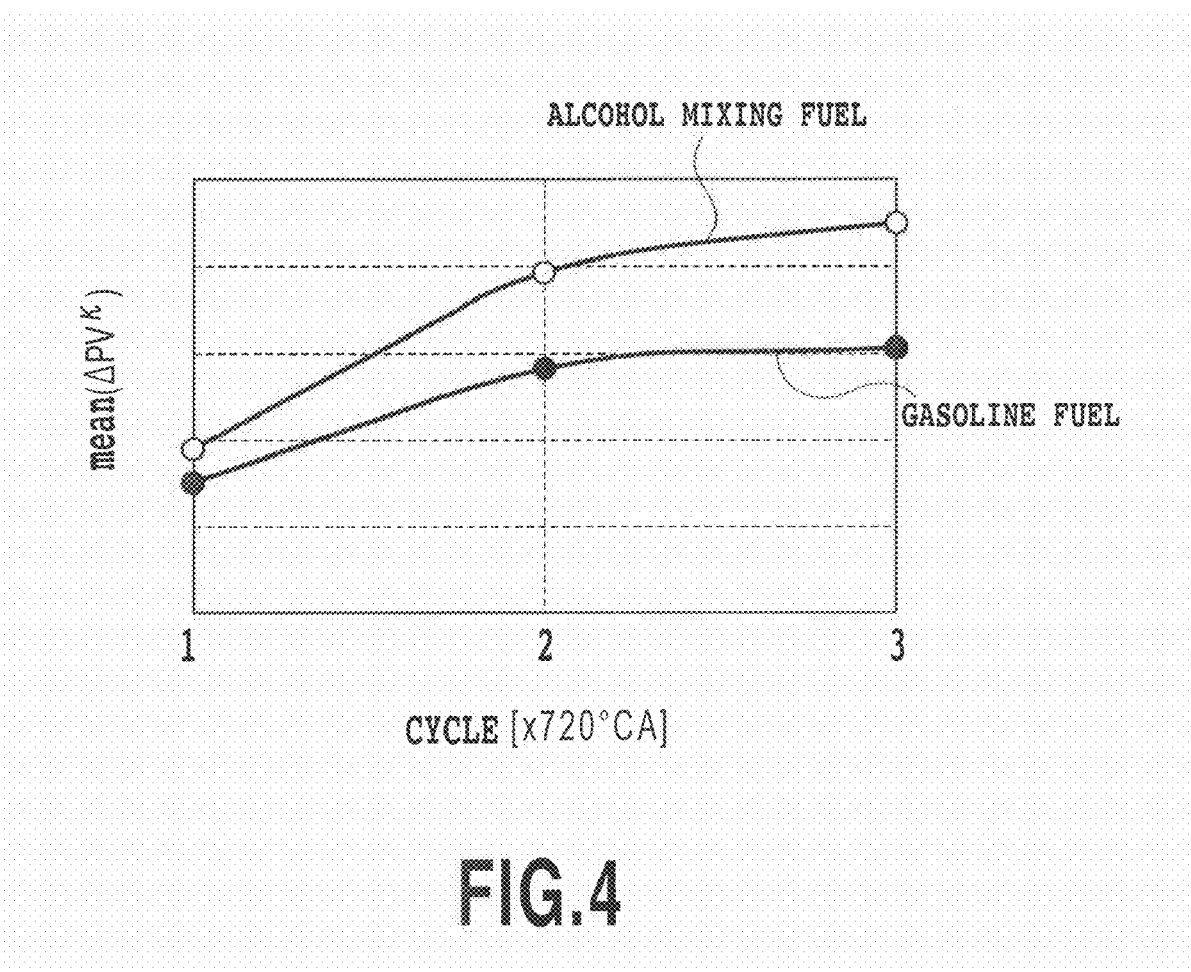
FIG. 4 is a graph exemplifying a transition in a heat release quantity parameter in each of a case of alcohol mixing fuel and a case of gasoline fuel.

A value of this mean value mean ($\Delta PV^\kappa$), as shown in FIG. 4, differs depending on property of fuel, and is a larger value in a case of alcohol fuel than in a case of gasoline fuel. The mean value mean ($\Delta PV^\kappa$) is compared with a reference value α as a mean value for the respective cycles in regard to an increasing quantity $\Delta PV^\kappa$ of $PV^\kappa$ as the heat release quantity parameter from a bottom dead center during an intake stroke in the reference fuel (gasoline).

When the mean value mean ($\Delta PV^\kappa$) is smaller than the reference value α corresponding to the reference fuel (gasoline), next the ECU 20 compares a mean value of the combustion delays dCS for the respective cycles with the value in the reference fuel (gasoline) (S80). Specifically, the ECU 20 integrates the values of the combustion delays dCS calculated at step S50 for the respective cycles according to the following equation (2). The integrated value is divided by the number n of cylinders to calculate a mean value mean (dCS).

$$\mathrm{mean}(dCS) = \frac{1}{n}\sum_{i=1}^{n} dCS_i \quad (2)$$

The mean value mean (dCS) is compared with a reference value β of the combustion delay dCS corresponding to the reference fuel.

If the mean value mean (dCS) is smaller than the reference value β of the combustion delay dCS corresponding to the reference fuel, the ECU 20 sets 1 to a given alcohol mixing fuel use flag in the RAM in the ECU 20 to 1 for fuel ignition-ability determination (S90), since alcohol mixing fuel is considered to be used. The alcohol mixing fuel use flag is referred to as needed in the next corresponding control and in the other control.

If the mean value mean ($\Delta PV^\kappa$) is larger than the reference value α at step S70, or if the mean value mean (dCS) is larger than the reference value β at step S80, the ECU 20 sets 0 to the alcohol mixing fuel use flag for resetting (S110), since gasoline fuel is considered to be used.

The ECU 20 changes operating maps, in response to the fuel ignition-ability determinations (S90 and S100). Specifically, in accordance with reference of the alcohol mixing fuel use flag, among two kinds of fuel injection maps, two kinds of fuel injection timing maps and two kinds of ignition timing maps, one kind for alcohol mixing fuel of these maps respectively is selected if alcohol mixing fuel is used, and the other kind for gasoline fuel of these maps respectively is selected if gasoline fuel is used. The selected maps are respectively used for controlling fuel injection quantity, injection timing and ignition timing.

As a result of the above processes, if the mean value of the heat release quantity parameter is smaller than the reference value α and the mean value of the combustion delay is smaller than the reference value β, the control map for alcohol mixing fuel is selected, which will be used for controlling the engine.

As thus described, in the present embodiment, since the fuel property is determined based upon both of heat release quantity parameter and combustion delay, it is possible to accurately determine fuel property. Further, in the present embodiment, since the fuel property can be determined at an initial stage of engine starting, a change of the associated control can be quickly performed.

In the present embodiment, since the mean value of the detected heat release quantity parameters for the respective cycles is compared with an average value of the heat release quantity parameter for the respective cycles to the reference fuel, it is possible to increase detection accuracy by increasing an S/N ratio of detection values. In addition, in the present embodiment, since the value (heat release rate) found by dividing the heat release quantity $\Delta PV^\kappa$ as the indicated heat quantity by the lower heating quantity $Q_{fuel}$ is used as a heat release quantity parameter, an influence of the fuel injection quantity Tau can be correctly reflected to improve detection accuracy.

In the present embodiment, since the combustion delay dCS is calculated based upon a changing quantity of a combustion rate, a desired effect of the present invention can be achieved with a simple construction.

In the present embodiment, since a plurality of control maps in advance produced for respective fuel property is changed based upon a determination result of the fuel property, a desired effect of the present invention can be achieved with a simple construction.

It should be noted that in the above embodiment, the present invention is explained specifically to a point, but it should be understood that various changes and modifications of the present invention can be made without departure from the spirit or scope of the invention as defined in the claims. That is, the present invention includes modifications and changes contained in the scope of the claims, the scope of its equivalents and the spirit thereof. For example, in the present embodiment, a mean value of heat release quantity parameter for respective cycles is compared with a reference value, but instead of this construction, an integrated value of heat release quantity parameters for the respective cycle may be compared with the integrated value of heat release quantity parameters for the respective cycles corresponding to the reference fuel. In this case also, the similar effect can be obtained. In addition, in the present embodiment, an associated control using a determination result of the fuel property is realized by changing between a plurality of maps, but the associated control in the present invention may be realized by changing between a plurality of functions corresponding to the determination result of the fuel property or by correcting control variables or constants corresponding thereto.

In the present embodiment, there is explained an example where the present invention is applied to an internal combustion engine for a vehicle capable of using gasoline fuel and alcohol mixing fuel, but the present invention may be applied to an internal combustion engine using other kinds of fuel or a hybrid vehicle containing various types of internal combustion engines as a drive source.

INDUSTRIAL APPLICABILITY

The present invention can be used for accurately determining fuel property.

The invention claimed is:

1. A control apparatus of an internal combustion engine comprising:
   in-cylinder pressure detecting means for detecting an in-cylinder pressure in a combustion chamber of an internal combustion engine;
   heat release quantity parameter calculating means for calculating a heat release quantity parameter showing a combustion state based upon the detected in-cylinder pressure;
   combustion delay calculating means for calculating a combustion delay based upon the detected in-cylinder pressure; and
   fuel property determining means for determining alcohol content state in fuel as fuel property based upon a comparison between the calculated heat release quantity parameter and the calculated combustion delay, and a heat release quantity parameter and a combustion delay corresponding to reference fuel.

2. A control apparatus of internal combustion engine according to claim 1, wherein:
   the heat release quantity parameter calculating means calculates a product value of the detected in-cylinder pressure and a value found by exponentiating a combustion chamber volume at a point of detecting the in-cylinder pressure with a value close to a ratio of specific heat of a mixture supplied, as the heat release quantity parameter.

3. A control apparatus of internal combustion engine according to claim 1, wherein:
   the fuel property determining means compares a mean value of the heat release quantity parameters for the respective cycles with a mean value of the heat release quantity parameters for the respective cycles corresponding to the reference fuel.

4. A control apparatus of internal combustion engine according to claim 1, wherein:
   the fuel property determining means compares an integrated value of the heat release quantity parameters for the respective cycles with an integrated value of the heat release quantity parameters for respective cycles corresponding to the reference fuel.

5. A control apparatus of internal combustion engine according to claim 1, wherein:
   the heat release quantity parameter calculating means calculates a value found by dividing an indicated heat quantity by a lower heating quantity, as the heat release quantity parameter.

6. A control apparatus of internal combustion engine according to claim 1, wherein:
   the combustion delay calculating means calculates the combustion delay based upon a changing quantity of a combustion rate.

7. A control apparatus of internal combustion engine according to claim 1, further comprising:
   changing means for changing a plurality of control value maps based upon the determination result of the fuel property determining means.

* * * * *